United States Patent [19]

Friedel

[11] 4,305,012

[45] Dec. 8, 1981

[54] ELECTRIC FISHING MOTOR THRUST TRANSFER MEANS

[75] Inventor: David G. Friedel, Oshkosh, Wis.

[73] Assignee: Brunswick Corporation, Skokie, Ill.

[21] Appl. No.: 100,863

[22] Filed: Dec. 6, 1979

[51] Int. Cl.³ .............................................. H02K 5/12
[52] U.S. Cl. ...................................... 310/87; 310/83; 310/90; 440/6
[58] Field of Search ........................... 310/87, 83, 90; 115/18 E

[56] References Cited

U.S. PATENT DOCUMENTS

| | | | |
|---|---|---|---|
| 877,016 | 1/1908 | Tirrill | 310/83 |
| 3,593,050 | 7/1971 | Ware | 310/87 |
| 4,009,677 | 3/1977 | Croisant | 115/18 E |
| 4,092,946 | 6/1978 | Kappas | 115/18 E |
| 4,099,478 | 7/1978 | Alexander | 115/18 E |

*Primary Examiner*—Donovan F. Duggan
*Attorney, Agent, or Firm*—O. Thomas Sessions

[57] ABSTRACT

An improved electric fishing motor having a planetary reduction assembly utilizes the axle for the planet member to transfer the thrust load from the propeller to the motor housing for movement of the boat.

5 Claims, 4 Drawing Figures

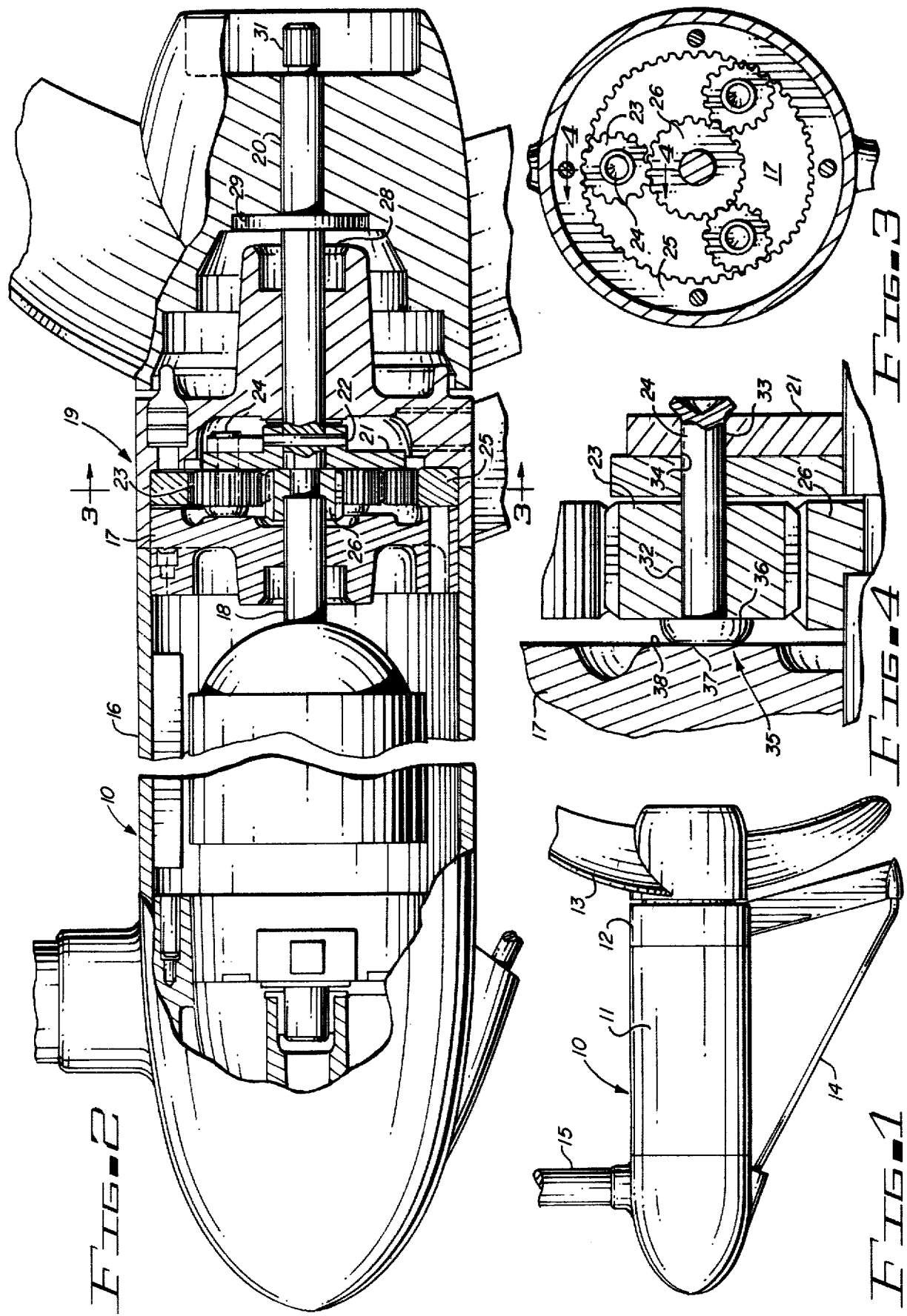

ELECTRIC FISHING MOTOR THRUST TRANSFER MEANS

TECHNICAL FIELD

This invention relates to electric fishing motors utilizing planetary reduction means and particularly concerns propeller thrust transfer means.

BACKGROUND ART

An electric fishing motor is attached to a boat to permit the propeller thrust to move the boat. Accordingly, the propeller thrust must be first transferred from the propeller to the electric fishing motor and then to the boat.

In one prior electric fishing motor utilizing a planetary gear reduction the thrust is transferred axially from the propeller through the propeller shaft to the motor shaft and through an end thrust bearing to the fishing motor housing. In another prior electric fishing motor having a planetary gear reduction the planetary gear reduction includes a front and rear planet carrier. The front planet carrier includes a thrust bearing which contacts the motor housing. Thrust is transferred from the propeller shaft to the rear planet carrier, from the rear planet carrier to the front planet carrier and from the front planet carrier to the motor housing. The transfer of the thrust in both of these prior electric fishing motors requires special thrust bearings and a high accuracy in manufacturing. This results in a complex and expensive electric fishing motor.

DISCLOSURE OF INVENTION

Applicant's electric fishing motor includes an electric fishing motor housing, an electric fishing motor within the housing having a motor output shaft and a planetary reduction means. The planetary reduction means includes a propeller shaft having a planet carrier fixed at one end, planet members each rotatably mounted on the planet carrier on an axle fixed to the planet carrier, a ring member driving with said planet members and fixed to the housing and a sun member driving said planet members and removably fixed to the motor output shaft. The electric fishing motor improvement includes the axle for supporting the planet member having a shoulder diameter for rotational support of the planet member, an end diameter passing through and non-rotationally fixed within a hole in the planet carrier and a head having an inner surface for retaining the planet member and having an outer substantially flat end surface. The motor housing has a motor end cap adjacent the planetary reduction means, the end cap including a flat thrust receiving surface in contact with the end surface of the axle during rotation of the planetary reduction means.

The propeller thrust load is transferred from the outer substantially flat end surface of at least one of the axles to the thrust receiving surface of the motor housing end cap. The transfer of the thrust from the axle head to the end cap provides a simple low-cost electric fishing motor. In addition the thrust carrying components require less accuracy and are less critical than prior units. Also the use of the axle to transmit the thrust eliminates the need for a special thrust bearing and further provides a compact electric fishing motor since no additional space is required for a separate thrust bearing.

BRIEF DESCRIPTION OF DRAWINGS

FIG. 1 is a side elevational view of an electric fishing motor.

FIG. 2 is an enlarged side elevational partly sectional view of the electric fishing motor shown in FIG. 1.

FIG. 3 is an enlarged cross-sectional view on section line 3—3 of FIG. 2.

FIG. 4 is an enlarged sectional view of a portion of the electric fishing motor of FIG. 1 particularly illustrating the end surface of the axle in contact with the thrust receiving surface of the motor housing.

BEST MODE FOR CARRYING OUT THE INVENTION

In FIG. 1 an electric fishing motor 10 includes a motor 11, a planetary gear reduction assembly 12, a propeller 13 and a skeg 14. The electric fishing motor 10 is attached through a support tube 15 and a mounting bracket (not shown) to a boat (not shown) as is described in U.S. Pat. No. 4,099,478.

Referring to FIGS. 2 and 3, the motor 11 includes a motor housing 16 having an end cap 17 and a motor shaft 18. The planetary reduction assembly 12 includes a planetary reduction housing 19 and a propeller shaft 20 having a planet carrier 21 fixed at one end with a pin 22. Planet members or planet gears 23 are rotatably mounted on the planet carrier 21 on axles 24 fixed to the planet carrier 21 as will be described.

A ring member or ring gear 25 is engaged with the planet members 23 and is fixed to the planetary reduction assembly housing 19. A sun member or sun gear 26 is drivingly engaged with the planet gears 23 and removably fixed to the motor shaft 18. The planetary reduction assembly housing 19 includes a bearing surface portion 27 for support of the propeller shaft 20 and a seal 28. A washer 29 is positioned between the planetary reduction assembly housing 19 and the propeller 13 and a special contoured nut 30 is attached to a threaded portion 31 of the propeller shaft 20 to retain the propeller 13.

FIG. 4 illustrates an axle 24 having a shoulder diameter 32 for rotational support of the planet gear 23. The axle 24 also has an end diameter 33 which passes through and is non-rotationally fixed in a hole 34 in the planet carrier 21 by riveting the end diameter 33 extending outside the hole 34. The axle 24 also includes a head 35 having an inner surface 36 for retaining the planet gear 23 and having an outer substantially flat end surface 37.

The end cap 17 of the motor housing 16 adjacent the planetary reduction assembly 12 has a flat thrust receiving surface 38 in contact with the end surface 37 of the axle 24 during rotation of the planetary reduction assembly 12.

In the operation of the electric fishing motor 10 the motor 11 rotates sun gear 26 which is positioned on the motor shaft 18. Sun gear 26 engages three planet gears 23 to rotate these gears. The planet gears 23 also engage ring gear 25 which is fixed to the planetary reduction assembly housing 19. Therefore rotation of the sun gear 26 causes the planet gears 23 to roll inside the ring gear 25. The rolling of the planet gears 23 causes rotation of the planet carrier 21 and the propeller shaft 20 which rotates the propeller 13. Rotation of the propeller 13 within water causes thrust transfer from the propeller 13 to the electric fishing motor 10 to the boat thereby moving the boat.

The thrust initially transfers from the propeller 13 to the propeller shaft 20. The thrust then transfers from the propeller shaft 20 to the planet carrier 21 and from the planet carrier 21 to the axles 24. The thrust then transfers from the flat end surface 37 on the head 35 of the axle 24 to the substantially flat thrust receiving surface 38 on the end cap 17 of the motor housing 16 and is finally transferred from the electric fishing motor 10 to the boat.

In the preferred embodiment the end cap 17 including the thrust receiving surface 38 is formed of die cast aluminum alloy and the axle 24 including the flat end surface 37 is made of a compatable low-friction metal such as steel. The surface finish of the end surface 37 and the thrust receiving surface 38 must be of bearing quality to prevent wear and galling. The surface 37 and 38 must be substantially flat and have substantially full surface contact. This is essential to maintain a film of oil between these surfaces. Alternatively one of the axles 24 or thrust receiving surface 37 could be formed of a plastic low-friction material such as nylon or teflon. The axles 24 or thrust receiving surface 38 may be formed of the low-friction material or inserts of the low-friction material may be provided to provide the thrust transfer.

In the preferred embodiment three axles 24 provide three equally spaced thrust transfer surfaces. This is believed to provide equalization or balancing of the thrust load from the planet carrier 21 to the end cap 17. The propeller thrust is transferred through the axles 24 to the end cap 17.

The thrust receiving surface 38 is shown in FIG. 4 as a ring-like surface. The ring-like surface receives the thrust from the head 35 of the axle 24 at a radius substantially equal to the sum of the radius of the sun gear 26 and the radius of the planet gear 23.

I claim:

1. An electric fishing motor including
   (A) an electric fishing motor housing,
   (B) an electric motor within said housing having a motor output shaft, and
   (C) a planetary reduction assembly including a propeller shaft having a planet carrier fixed at one end, planet members each rotatably mounted on said planet carrier on an axle fixed to said planet carrier, a ring member driving with said planet members and fixed to said housing and a sun member driving said planet members and removably fixed to said motor shaft, wherein the improvement comprises:
   a. the axle for supporting the planet member having a shoulder diameter for rotational support of said planet member, an end diameter passing through and non-rotationally fixed within a hole in said planet carrier and an outer substantially flat end surface,
   b. and the motor housing having a motor end cap adjacent said planetary reduction assembly, said end cap including a flat thrust receiving surface in contact with said end surface of said axle during rotation of said planetary reduction means.

2. The electric fishing motor defined in claim 1 wherein said axle has a head having an inner surface for retaining said planet member and forms said outer substantially flat end surface each of said heads for said axle formed of a metal and said thrust receiving surface formed of a compatable low-friction material.

3. The electric fishing motor defined in claim 1 wherein one of said axle flat end surface and said thrust receiving surface is of a plastic low-friction material.

4. The electric fishing motor defined in claim 2 or 3 wherein said planetary reduction means includes at least three planet members with said flat thrust receiving surface in contact with at least one of said axle flat end surface whereby propeller thrust is distributed to said end cap.

5. The electric fishing motor defined in claim 1 wherein the thrust receiving surface receives thrust from said end surface of said axle at a radius substantially equal to the sum of the radius of the sun member and the radius of the planet member.

* * * * *